United States Patent [19]

Pardes

[11] Patent Number: 5,794,535
[45] Date of Patent: Aug. 18, 1998

[54] SWITCHING MECHANISM FOR TRANSIT MODULES

[76] Inventor: Herman I. Pardes, 45 Wickapecko Dr., Ocean, N.J. 07712-4137

[21] Appl. No.: 835,905

[22] Filed: Apr. 10, 1997

[51] Int. Cl.$^6$ .................................................. B61B 12/00
[52] U.S. Cl. ........................................ 104/130.07; 104/124
[58] Field of Search ................... 104/130.01, 130.02, 104/130.07, 124, 118

[56] References Cited

U.S. PATENT DOCUMENTS

| | | | |
|---|---|---|---|
| 3,763,788 | 10/1973 | Pougue | 104/130.02 |
| 3,828,686 | 8/1974 | Steenbeck et al. | 104/130.02 |
| 3,841,227 | 10/1974 | Fink | 104/130.02 |
| 3,854,412 | 12/1974 | Dull | 104/130.02 |
| 3,931,767 | 1/1976 | Karch | 104/130.02 |
| 3,994,236 | 11/1976 | Dull et al. | 104/130.02 |
| 4,132,175 | 1/1979 | Miller | 104/130 |
| 4,671,185 | 6/1987 | Anderson | 104/130 |
| 4,991,516 | 2/1991 | Rixen | 104/130 |
| 5,063,857 | 11/1991 | Kissel, Jr. | 104/88 |
| 5,138,952 | 8/1992 | Low | 105/72.2 |
| 5,277,124 | 1/1994 | DiFonso | 104/130 |

FOREIGN PATENT DOCUMENTS 26 12 511  10/1977  Germany ............... 104/130.02

Primary Examiner—Mark T. Le

[57] ABSTRACT

An electromagnetic switching mechanism for use in a transit system employing automated, self-propelled transit modules travelling on a guideway. The switching mechanism can be selectively activated by an on-board computer to move into magnetic engagement with lateral guidance bars built onto the guideway to direct the transit module to merge into, or exit from the guideway, or to maintain direction on the guideway, without motion of any portion of the guideway itself.

2 Claims, 6 Drawing Sheets

SWITCHING MECHANISM FOR TRANSIT MODULES

BACKGROUND

1. Field of Invention

This invention relates to a switching mechanism for use on self propelled, automated electric transit modules, normally travelling on a guideway, wherein entrance and exiting at selected portions of the guideway can be accomplished upon computer command within the module without motion of any portion of the guideway itself.

2. Description of Prior Art

A variety of ground transportation systems have been developed and put into practice since the advent of the industrial revolution. Private automotive transit has become the method of choice for most commuters wherever circumstances permit. Mass transit, in the form of rail or bus, has run a very poor second because of inefficienceies and relative inconvenience. The result has been excessive congestion on the highways, traffic delays and air pollution. Mass transit has consequently suffered from high costs and under-utilization.

Within recent years, specifically with the advent of inexpensive and very reliable computer systems, efficient electric propulsion vehicles, and digital communications, a new form of mass transit has become technically feasible which eliminates the major deficiencies and inconveniences of current mass transit systems. This is known as Personal Rapid Transit (PRT). Its salient, and most desirable characteristics from a commuter standpoint are: an exclusive guideway not vulnerable to normal traffic congestion, access to this guideway by PRT system modules obtainable at convenient off-line stations, and transit modules available on a demand basis. Some types of PRT systems may also be accessed by private electric vehicles compatible with the guideway system requirements. Once a destination is entered into the module computer, by the commuter, the module will proceed non-stop to its final destination. U.S. Pat. No. 5,063,857 to Kissel, Jr. (1991) describes in the narrative of his "Comprehensive Unit Transportation System" most of the features and virtues of PRT. The operational concept of PRT, as described, has been well documented in the open literature for several decades prior to this patent. Specifically, however, the proposed implementation of the vehicle switching system in his patent is dependent upon a complex switching mechanism within a highly specialized vehicle, and the motion of a hinged section of the guideway. This is very undesirable from a reliability standpoint considering that on a busy commuting system this action may be required several thousand times per day at very rapid rates. It is mandatory to keep the guideway totally passive, and the vehicle mechanism as simple as possible.

The terms "module" and "vehicle" as used here are interchangeable. The former is used generally in referring to a transport container which belongs to the PRT system and is obtainable at off-line stations. It may carry passengers or freight. A vehicle is privately owned but contains in its design those features necessary for permitting access to the PRT guideway.

Many organizations and individuals have endeavored to implement the PRT concept. From the system description referred to above, and in the prior art cited below, all of the approaches make note of the need for a reliable switching mechanism on the module which permits the guideway to be completely passive. The importance of such a mechanism becomes obvious when one considers the fact that there may be several thousand individual modules or vehicles within the commuter system, entering and exiting the guideway with very short lead times. Motion requirements of any element on the guideway would seriously degrade the efficiency and safety of the system. All of the patents reviewed in the prior art such as U.S. Pat. Nos. 4,671,185 (1987) and 4,522,128 (1985) to Anderson, U.S. Pat. No. 5,138,952 (1992) to Low, U.S. Pat. No. 5,277,124 (1994) to DiFonso, U.S. Pat. No. 4,132,175 (1979) to Millerl/Westinghouse, and U.S. Pat. No. 4,991,516 (1991) to Rixen fulfill these requirements. However, the complexity of the switching mechanisms and specialization of the transit vehicles, and the guideways on which they travel, make the automatic switches extremely complex and expensive, and possibly less reliable than would be mandatory for a public mass transit system.

OBJECTS AND ADVANTAGES

Accordingly, several objects and advantages of the present invention are:

(a) to provide a transit module constraining switch mechanism, which can also be readily incorporated into a standard electric vehicle in its initial design, which can be activated by computer command within the module to control and direct the module at points of guideway divergence;

(b) to provide a fail safe means whereby this switch mechanism can engage a guidance bar permanently attached to the guideway in those areas critical to merge or exit of the modules onto or off the guideway.

(c) to provide a means whereby the module can be disengaged from a base guide at those portions of the guideway where merge or exit are required. The base guide is a central, vertical constraint which normally runs the entire length of the guideway and is engaged by a mechanism extending from the bottom of the module. The base guide also serves as a means of power pickup for the module.

(d) to permit the utlization of a standard electrical vehicle chassis as the primary transit module for a PRT system. This will take advantage of the innumerable engineering hours invested in automotive design and will radically reduce the cost of the overall system from the standpoints of initial cost and subsequent maintenance.

Further objects and advantages will become apparent from a consideration of the ensuing description and drawings.

DRAWING FIGURES

SUMMARY

A switching mechanism for transit modules of a PRT system, including lateral guidance bars at entrance and exit sections of the system guideway, which provide means for selecting a path for the module upon command from its internal computer.

DESCRIPTION-FIGS. 1 TO 6

Figure 1:
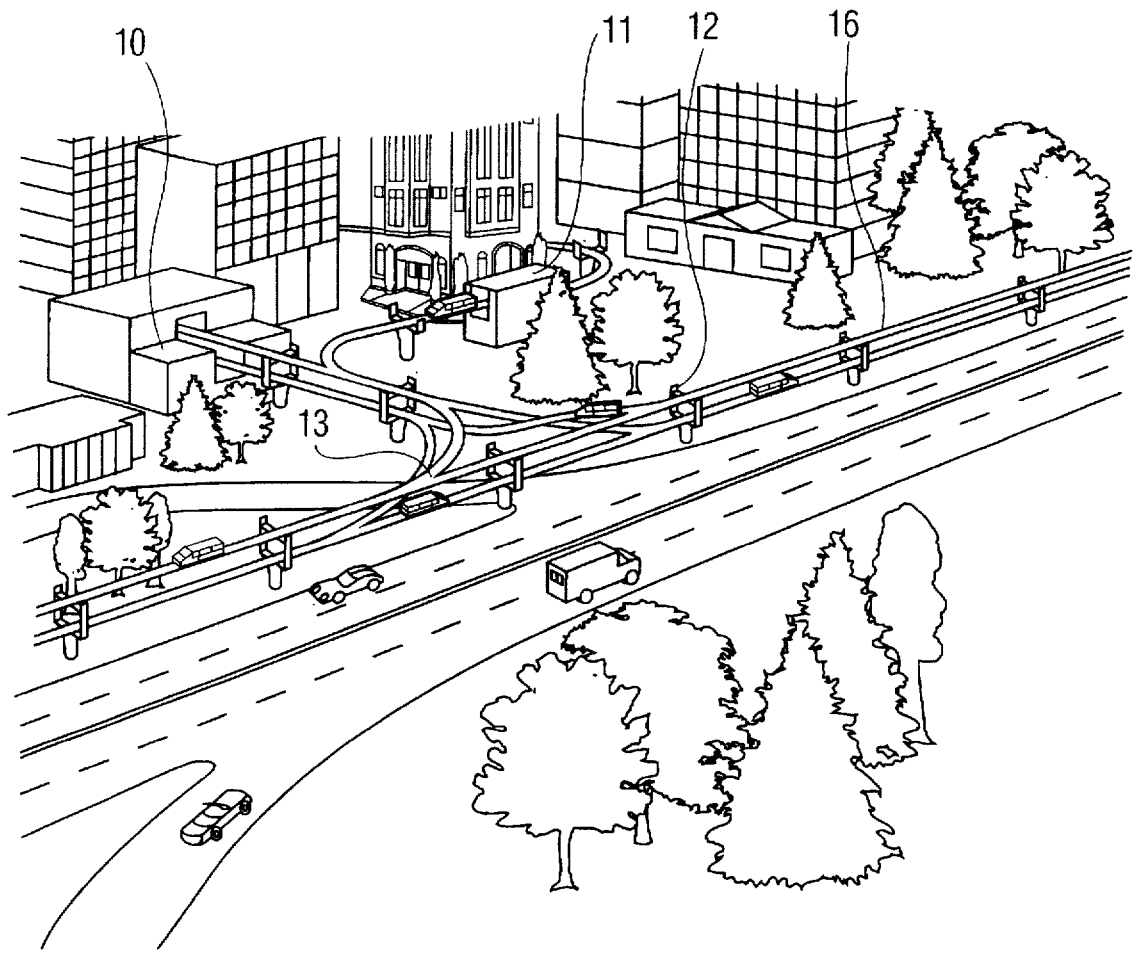
FIG. 1 shows an artists concept of a bi-directional PRT commuter system with off-line stations for transit modules and checkout area for privately owned electric vehicles leading into a main elevated guideway.

A typical embodiment of a dual level, bi-directional PRT commuter system is shown in FIG. 1 to illustrate the environment of the transit modules, or private electric vehicles, as they access or exit a main guideway 16. An urban system may be single level, unidirectional. Off-line stations 10 are placed at convenient locations, for commuter or pedestrian convenience, which contain PRT system modules. Separate off-line access stations 11 are available for private electric vehicles. In either case there are numerous automatic switching actions required at all positions similar to 13 to enable the modules to proceed to their destinations. Support structures 12 occur at intervals along the guideway. These also contain a digital positioning information display which can be read off by standard electro-optical means on the modules, as they pass, so that each module's computer can determine its position and calculate its desired exit point.

Figure 2:
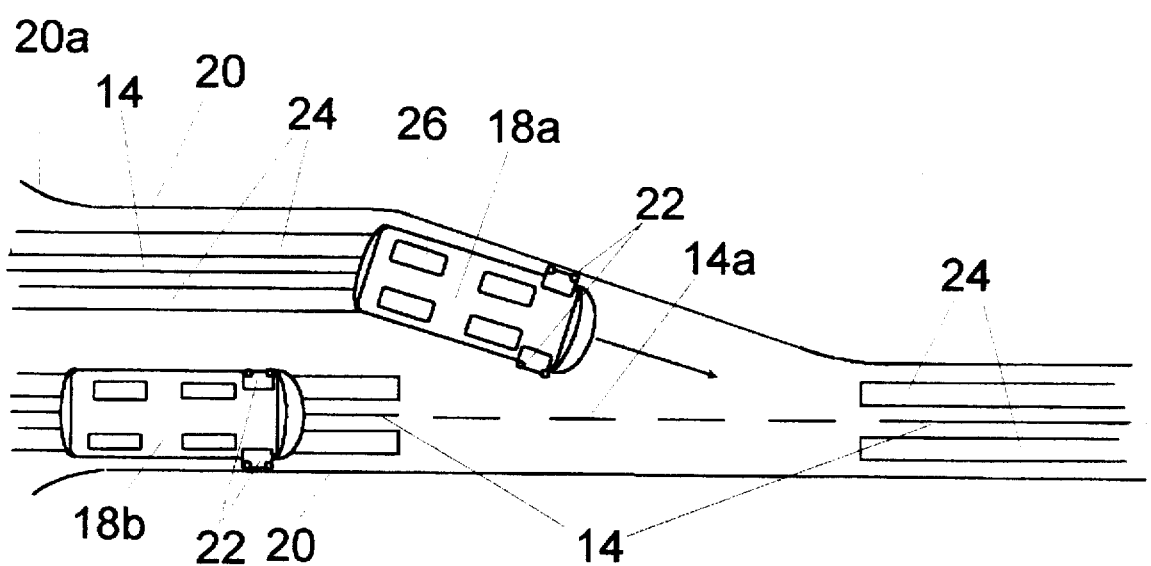
FIG. 2 shows a top plan view of a typical guideway section at an entrance position with a module on the upper portion entering the main guideway ahead of a module already on the guideway. It shows lateral guidance bars on the entrance section of the guideway engaged by an electromagnetic module constraint, and also on the through traffic section engaged by the the second module.

FIG. 2 is a top plan view of a section of the PRT system guideway at a point of entrance merge into the main guideway. Transit modules 18a and 18b are shown on the guideway in positions such that the upper module 18a, which is proceeding from a siding, is in the process of entering the main high speed line ahead of module 18b. Means are provided, initially by a central computer scheduling control which is contained in the overall system software, and secondarily by continuous communications between the modules which provides mutual position, range and range rate information, to insure that the modules are not on a collision course. The modules are cooperative in the sense that each can accelerate, or decelerate upon command. Techniques for implementing this capability are well known by those familiar with the computer and intercept art. Lateral guide bars 20 are built onto all sections of the guideway which are in proximity to an entrance merge or exit section. These are sturdy mechanical structures which are accessed by an electromagnetic constraint mechanism 22 on each module, activated by an on board computer. This mechanism provides positive guidance to the module at all sections where the base guide 14 is recessed, as at 14a. The base guide is the normal guidance means for the modules along the guideway. It has the additional function of providing electrical power to the modules. The base guide is recessed 14a into the guideway, or it may be discontinuous, in those areas where merge and exit actions are required so that the wheels of the modules can pass smoothly from one guideway section to another. Power is provided to the modules at these recessed sections by automatic electronic switching to an on-board battery supply. The lateral guidebars start considerably before the recessed portions of the base guide,
and stop well after the base guide is raised, to insure that there is positive engagement with the base guide and positive control of the modules at all times.

Figure 3:
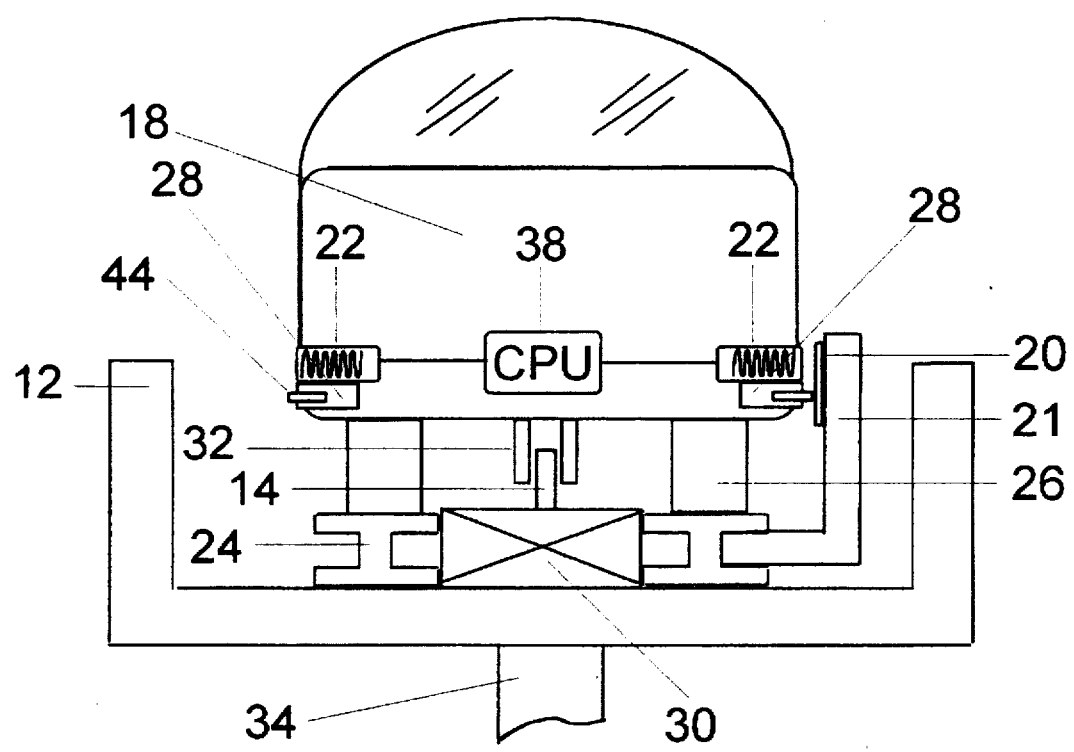
FIG. 3 shows a front view cross section, just ahead of the front wheels, of a module riding on the guideway at the entrance section with the electromagnetic module constraint engaged to the lateral guidance bar.

FIG. 3 is a front view cross section of a transit module 18 in front of the front wheels. The transit module, as shown, is positioned on the guideway at a support tower 12. The guideway itself is an open structure consisting of steel I beams 24, or prestressed concrete girders, mounted between guideway system supports 12 which are spaced at regular intervals along the right of way. A support pillar 34 anchors and elevates the guideway as necessary. There are cross braces 30 between the girders along the guideway necessary to maintain the strucural integrity and stiffness of the guideway, and to support the central baseguide 14. The central baseguide is normally engaged by the module's power pickup 32 which guides the module for the major part of its travel on the guideway. The only places where the guideway is a solid roadway surface is at the merge or exit crossover sections where the baseguide 14 is recessed, or discontinued, and smooth module transition is required by the tires 26 from one section of the guideway to another. To effect a transition in an area of guideway divergence the electromagnetic constraint fixture 22 on one side of the module is activated selectively by an onboard computer 38, labeled CPU. The module is thereby attracted to a lateral guidance bar 20. The logic circuitry insures that one or the other electromagnetic constraint mechanisms keeps the module under positive control in the areas of guideway divergence. There may be a multiplicity of these electromagnetic constraint mechanisms on the module as necessary for safety and reliability.

Figure 4:
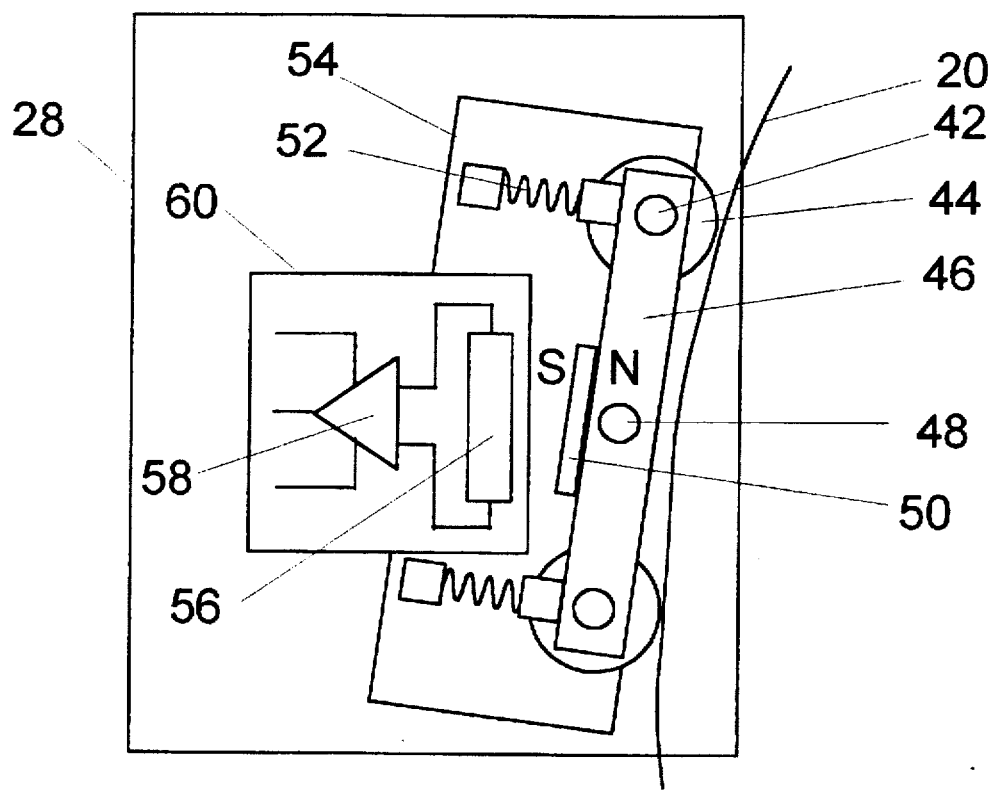
FIG. 4 is a sensing mechanism attached to the mechanical structure of the module which measures the curvature of the lateral guidance bar to adjust the front wheel steering and also maintains a gap between the electromagnet and the lateral guidance bar.

FIG. 4 is a diagram of the electromechanical assembly 28 which is rigidly attached to the electromagnet fixture 22 on the module chassis.. The electromechanical assembly contains idler wheels 44 which serve the dual function of determining guidance bar 20 curvature needed for control steering information, and maintaining a small gap between the electromagnet and the bar. The wheels are free rolling on axles 42 mounted on a connecting arm 46 which pivots on a central axle 48. The central axle 48 is attached rigidly to the module chassis. When the electromagnetic constraining mechanism is activated, a pair of compression springs 52 attached to a cover plate 54 forces the wheels against the lateral guidance bar 20 and the connecting arm will rotate about the central axle 48 proportional to the guidance bar curvature. A wafer type magnet 50 is mounted on the connecting arm. A Hall effect wafer 56 is mounted on a circuit board 60 in close proximity to the magnet so the wafer is bathed in its flux field. When a current flows in the Hall wafer, a voltage appears at its terminals, and the input to the amplifier 58, proportional to the angle between the Hall wafer and the magnet. The output of the amplifier drives the steering wheel of the transit module to conform to the curvature of the guidance bar. A Hall Effect Magnetic Potentiometer, in a different form, is available commercially for such angle measurement applications and the technology is well known. The lateral guidance bar 20 contains ferrous material to provide magnetic attraction.

Figure 5:
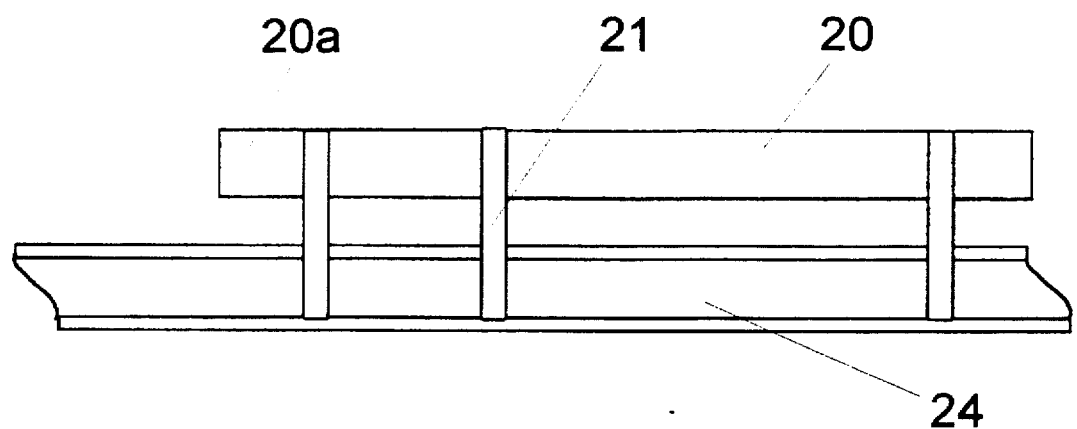
FIG. 5 is a side elevation view of the lateral guidance bar attached to the guideway.

FIG. 5 is a side elevational view of a section of the lateral guidance bar. The primary function of the lateral guidance bar 20 is to constrain the module along the guideway when the central baseguide is recessed. It is flared outward at section 20a, also shown in FIG. 2, to insure smooth entry by the transit modules although there should be little chance for actual contact since the module is always under primary control at these points by the central baseguide.

Figure 6:
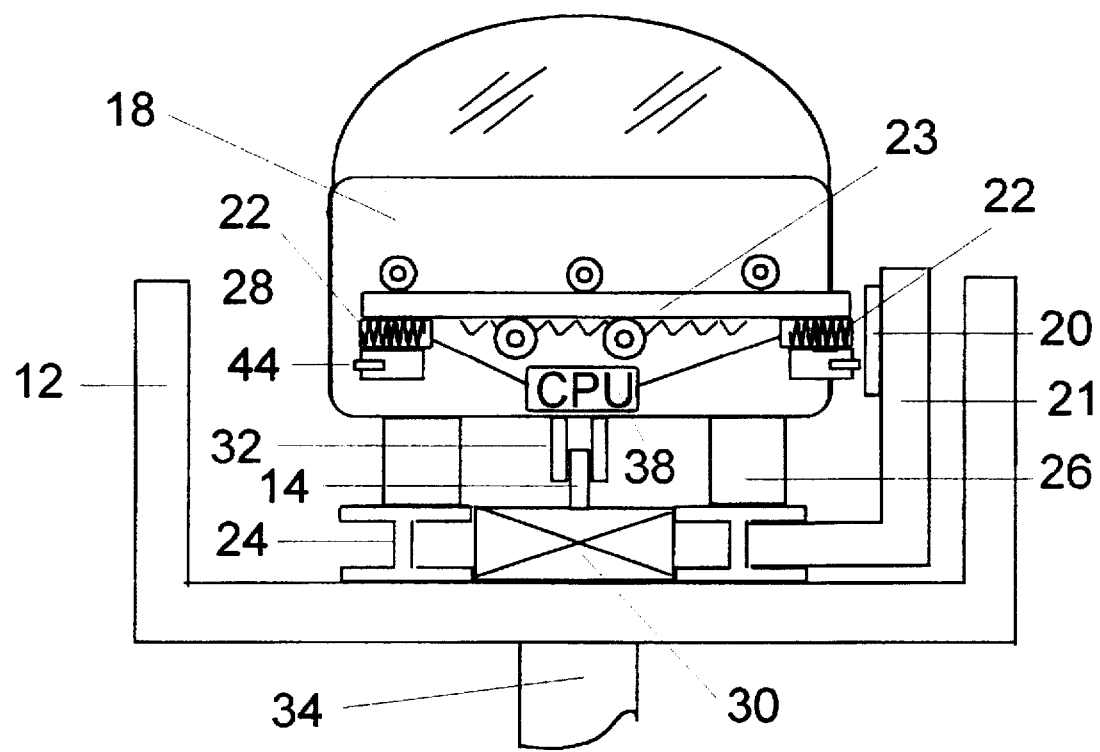
FIG. 6 shows a front view cross section, essentially the same as FIG. 3, with the addition of a mechanically driven electromagnetic constraint to allow for guideway width variations.

FIG. 6 is essentially the same as FIG. 3 except that in this case the electromagnetic constraint mechanism is mounted on a slide fixture controlled by the computer such that it can be moved horizontally a short distance beyond the side of the transit module until the idler wheels of the electromechanical assembly 28 come in contact with the guidance bar. Means for doing this, whether pneumatic or servo, are well known by those familiar with such mechanisms. This insures that modules or private vehicles of varying widths can be accomodated on the guideway.

OPERATION-FIGS. 1 TO 6

In operation, the transit module 18 is directed along the high speed portion of the guideway 16 controlled by the baseguide. As the module approaches a point of divergence within the guideway system, the on board computer makes a decision as to the path to be followed from its internal preprogrammed information. If the decision is made to divert the module to a siding, which is any path other than the high speed line, computer logic will activate the appropriate electromagnetic constraint mechanism 22 accordingly. The electromagnet will then be attracted to the lateral guide bar a short distance down the line which will direct it to the desired siding. Otherwise the alternate electromagnet will be activated and the module will be attracted to the guide bar along the high speed line and the module will remain on its original course. In the reverse situation the module is directed from a siding leading from an off line station onto the high speed line as is shown in FIG. 2. In either case, there is no mechanical action required within the module, such as levers or gears to move, and the guideway itself is completely passive. The electronic operation within the module is very simple and reliable. At the crossover area where the baseguide is recessed, power is automatically switched to an onboard auxilliary battery supply (not shown in the drawings). In the event that a total system power failure occurs the auxilliary on board battery has sufficient capacity to fulfill all functions necessary to direct the transit module and to drive it for several miles to an exit line. This battery supply is also used within the confines of the off-line stations where it may not be desirable to have the central baseguide elevated and power surfaces exposed.

SUMMARY, RAMIFICATIONS, AND SCOPE

Accordingly, the reader will see that the on-board electromagnetic switching mechanism, and the guideway guidance bar of this invention present the ultimate in simplicity and reliabilty, particularly when compared with those cited in the prior art. It can be readily built into the initial design of a transit module for the PRT system, and it can be easily adapted, or built into the initial design of a standard electric vehicle in order to make it compatible for access to the guideway.

Although the description above contains many specifications, these should not be construed as limiting the scope of the invention but as merely providing an illustration of the presently preferred embodiment of this invention. For example, the electromagnetic constraining mechanism can be placed at different locations on the module, and may be multiple in number to insure adequate attraction, reliabilty and safety. Also, the Hall Effect circuitry function in the electromechanical assembly may be accomplished either electro-optically to measure the guidebar curvature, or directly by linear potentiometers mounted within the compression springs of the idler wheels. Tie-in to the module steering assembly can also be performed in a variety of ways, either by direct mechanical coupling, or electronically once there is an error signal available to direct its angular position.

Thus the scope of the invention should be determined by the appended claims and their legal equivalents, rather than by the examples given.

I claim:

1. A transportation system comprising:

at least one wheeled transit module provided with a switching mechanism including an electromagnetic constraining fixture at each side of the transit module, and an idler wheel electro-mechanical assembly mounted adjacent to and cooperating with each said electromagnetic constraining fixture;

a main guideway connected to a plurality of branch guideways by a plurality of merge guideway sections, said main and branch guideways being provided with a central base guide for guiding said wheeled transit module, first and second lateral guidance bars mounted on first and second sides of each of said merge guideway sections, respectively, said central base guide having recessed portions on said merge guideway sections so as to allow the wheeled transit module to travel through said merge guideway sections without interference with said central base guide; and wherein a control means is provided on said transit module to selectively activate a respective one of said electromagnetic constraining fixtures to follow a respective one of said first and second lateral guidance bars for guiding said transit module along a path defined by one of said guideways, and each said idler wheel electro-mechanical assembly is positioned to maintain a respective one of the electromagnetic constraining fixtures in close proximity to the respective one of the lateral guidance bars, and to provide curvature information of a respective one of the merge guideway sections to the control means for controlling wheel steering of said transit module.

2. The transport system of claim 1, wherein said electromagnetic restraining fixtures on the sides of said transit module are mounted on a slide member on said transit module in a manner to allow a respectively one of said electromagnetic restraining fixtures to slide closer to a respective one of said lateral guidance bars before said one of said electromagnetic restraining fixtures is activated by said control means.

* * * * *